April 12, 1966    W. E. RAY    3,245,782
METAL DISPERSIONS
Filed April 6, 1962
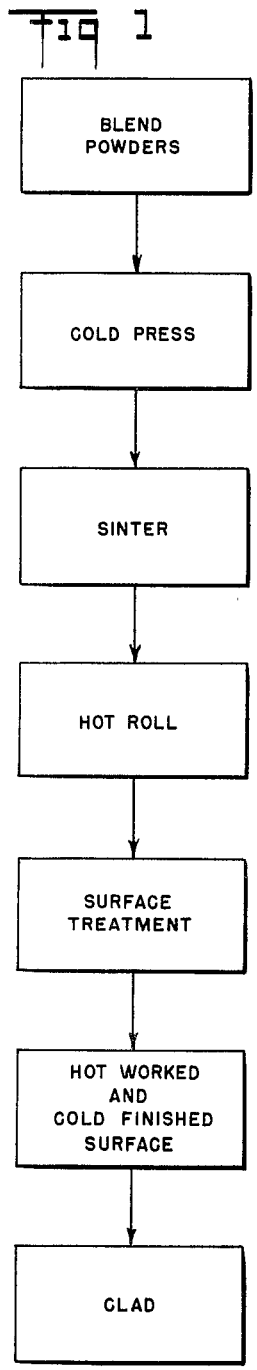
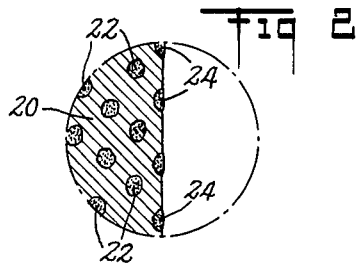
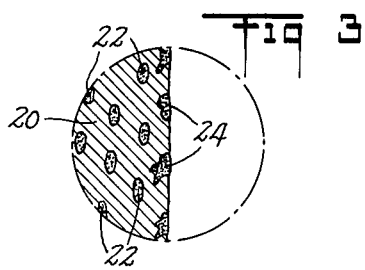
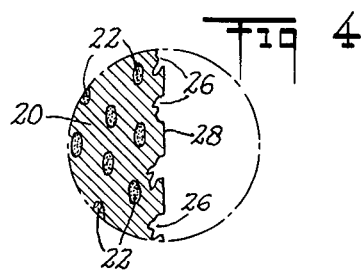
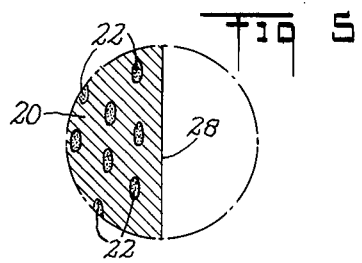
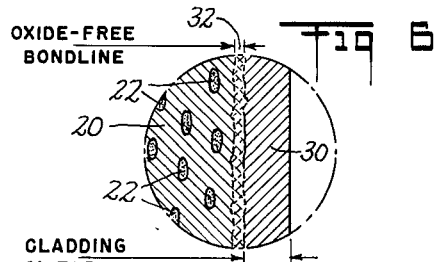
INVENTOR
William E. Ray
BY
Blair + Buckles
ATTORNEYS United States Patent Office 3,245,782
Patented Apr. 12, 1966

3,245,782
METAL DISPERSIONS
William E. Ray, Great Barrington, Mass., assignor to Dresser Products, Inc., Great Barrington, Mass.
Filed Apr. 6, 1962, Ser. No. 185,656
5 Claims. (Cl. 75—201)

The present invention is directed to adapting metallic matrices containing a suitable finely divided material dispersed therein for use in control rods for nuclear reactors and for structural and other purposes, and more particularly to forming and treating such dispersions.

The use of dispersed material in a metal matrix has become widespread in recent years, particularly with the improvement of techniques in powdered metallurgy. The uses of such dispersions are particularly applicable in the control of atomic reactions, since control rods and the dispersed neutron absorber material provide several advantages. The matrix metal can be very strong and corrosion-resistant to maintain required tolerances and to withstand the physical strains of "scram" loads and the corrosive pressures present in a nuclear reactor.

It has also been found that particle dispersion in many structural metals will result in increased strength of structural elements. Thus, for example, the strength of air craft parts such as spars, stringers, or skin may be substantially increased by a finely divided dispersion in an aluminum or aluminum alloy matrix.

For many of the applications of these dispersions, it is necessary or desirable that a cladding be applied, and it has been found necessary to join these structural elements by welding. The bonding of a cladding material or of one metal dispersion to another poses certain problems, particularly when there is oxide material present on the surface of the structural member. The invention is concerned with eliminating the necessity for cladding in certain structures and with improving the surface of structural members for cladding or bonding one to another while retaining strength in the member.

Nuclear reactors impose severe requirements on their component parts and control rods are particularly exposed to a corrosive environment at elevated temperatures and pressures, and accordingly must have considerable physical strength and corrosion resistance. In addition, the control rods must offer a large capture cross-section for thermal neutrons in order to perform their control function effectively.

Only a relatively small number of previously available materials could meet all of these physical requirements. The known boron-stainless steel control rods cannot withstand reactor conditions over extended periods of time, and the hafnium rods in naval reactors are impractical for ordinary commercial generation of electricity and power due to their extremely high cost.

It has been proposed to provide a practical control rod by dispersing a finely divided neutron absorber material in a finely divided metal powder and sintering the resultant mixture to provide a metal matrix containing the neutron absorber dispersed evenly throughout the matrix. In this structure, the matrix provides the requisite physical strength, and the dispersed neutron absorber is selected for its high capture cross-section for thermal neutrons. Selection of the proportions of dispersed absorber to matrix material permits determination of the control factor of the resulting control rod. However, rods prepared in this manner have heretofore not been entirely satisfactory. Since it is necessary to have a uniform dispersion of the absorbed particles in the matrix in order to achieve good neutron capture cross-sections, absorber material (typically a rear-earth oxide) is exposed on the rod surface. Since the control rods contact water or other liquids at very high temperatures and pressures, the exposed absorber particles would be dissolved away and escape into the reactor, contaminating the reactor cooling fluids. In addition, such exposed surface absorber particles cause localized heating and corrosion on the control rod itself.

In order to overcome these problems, attempts were made to clad the matrix-absorber control rod with a thin layer of a suitable corrosion resistant material, such as a stainless steel. Standard techniques of cladding (such as hot pack rolling) are difficult to use with these dispersions, since the neutron absorber particles on the surface made it difficult to achieve uniform metallurgical bonding between the matrix metal and the cladding layer. Weak bonding raised the possibility of rupture of the cladding, exposing the absorber particles to the corrosive conditions of the reactor, or causing control rod jamming.

Similar problems also exist in the use of these dispersions as structural members such as in aircraft. For use in spars, stringers, or the skin of high-speed aircraft, the metal dispersion is preferably clad to improve the corrosion resistance of the part and to increase its ductility.

Accordingly, it is an object of this invention to provide a dispersion of material in a metal matrix with the surface essentially consisting of the matrix alone.

It is a further object of the invention to provide structural elements having properties of the above character.

Another object of the invention is to provide methods of producing elements of the above character.

A further object of the invention is to provide improved nuclear reactor control rods having dispersions of the above character of neutron absorbing material.

Another object of the invention is to provide method for making improved control rods of the above character, which have a substantially uniform nuclear cross-section and a surface free of control materials.

A further object of the invention is to provide a method of making structural elements comprising a metal matrix having material dispersed therein to improve the physical properties of the resulting structural element.

Another object of the invention is to provide a structural element of the above character, which has a surface free of the dispersed medium.

A further object of the invention is to provide structural elements of the above character having exterior surfaces which are suitable for welding or cladding.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings in which:

FIGURE 1 is a flow diagram of the process.

FIGURE 2 is a fragmentary cross-section of a structural or control rod after the sintering process, showing the oxide on the surface.

FIGURE 3 is a fragmentary cross-section of the rod after final rolling or coining.

FIGURE 4 is a fragmentary cross-section of the rod after the surface oxide has been removed.

FIGURE 5 is a fragmentary cross-section of the rod showing the surface worked to a smooth finish.

FIGURE 6 is a fragmentary cross-section of the rod with a cladding applied.

According to the present invention, the metal selected for the matrix and the material which is to be dispersed in the matrix are reduced to finely divided state, for example, minus 325 mesh. As indicated by the flow diagram of FIGURE 1, selected proportions of the matrix metal and the material to be dispersed are blended, pressed and sintered. The resulting coherent object is subjected to further forming or compressing steps if desired, whereupon the object is treated with a suitable agent which selectively will dissolve the dispersed medium from the surface of the object either by chemical reaction or by dissolving away the dispersed medium. The resulting object, having a surface free of the dispersed material and consisting entirely of the matrix metal, may be then cold rolled, clad with a coating of a suitable metal, welded, and in general processed or handled as though the object consisted of the pure matrix metal.

The following examples are illustrative of the invention:

Example 1

A nuclear reactor control rod is made as follows:

Titanium metal of approximately 30 micron particle size (minus 325 mesh) and dysprosium oxide ($Dy_2O_3$) of approximately 30 micron particle size were uniformly blended in proportions of 70 percent by weight of titanium powder and 30 percent by weight of dysprosium oxide powder. The mixture was then cold pressed to approximately 85 percent of its minimum density, and then sintered for one and one half hours at a temperature of approximately 1500 degrees Fahrenheit. The resulting rod was encased in a steel envelope of .050 inch thick steel, and hot rolled at a temperature of approximately 1500 degrees Fahrenheit. After the hot rolling step, the steel envelope was removed by stripping and the surface oxide was dissolved by a solution of 50 percent aqueous nitric acid at about 100 degrees Fahrenheit. The rod was exposed to the nitric acid solution for approximately one half hour, during which all the surface dysprosium oxide was removed. The nitric acid, as well as removing the surface oxides, very slightly attacked the titanium matrix, and rounded off the edges of the minute cavities resulting from removal of the oxide. The rod was then washed to remove residual nitric acid, and dried.

At this stage the dysprosium oxide has been completely removed from the surface, leaving a layer of pure titanium matrix metal. If a thin cladding is acceptable for the intended application, this layer may be used after it has been densified by hot rolling, cold rolling, swaging or a similar metal working procedure. If a thicker cladding is desired, it may readily be provided by conventional fabrication methods because the oxide-free, porous surface insures good metallurgical bonding between metallurgically compatible cladding metals or alloys and the titanium dispersion matrix. The oxide-free surface layer is also well suited to soldering, brazing, and diffusion bonding operations of various types which may be desirable for special cladding or joining requirements.

The rod produced by this method overcomes the shortcomings of prior attempts to provide a control rod material dispersed in a matrix. Since there is a continuous external coating isolating the control material (dysprosium oxide) from the corrosive interior of the nuclear reactor, the dispersed material cannot escape from the control rod.

A number of matrix metals, including nickel, zirconium and their alloys, and a number of stainless steels may be used. The matrix metal must be stable in a nuclear reactor environment and have the necessary physical properties, such as melting point and physical strength. The dispersed neutron absorber or control material may comprise compounds of a number of rare earths and metals such as europium, samarium, gadolinium, boron and cadmium, their oxides, silicates, titanates, or other compounds which do not decompose at the processing temperature and pressures. Thus, compounds of boron and other metallic elements are suitable, provided that they are stable during processing operations such as compaction, sintering and hot working.

A wide variety of reagents or solvents other than nitric acid may be used to selectively dissolve the surface particles while attacking the matrix only slightly, if at all. Depending upon the particular materials involved, most common acids, bases, and water or steam may be employed successfully. Similarly, the particular temperatures and pressures indicated above are not to be regarded as critical, but are merely exemplary.

It has been found desirable that the dispersed particles be nearly spherical in form, and that these particles have a high crushing strength. This tends to prevent the formation of elongated fissures which might be produced if the dispersed particles were crushed and flattened during rolling or swaging operations. When the dispersed particles are nearly spherical in size and have a high crushing strength, the resulting pits or recesses left on the surface of the control rod after the surface dispersed particles are removed, will be rounded in contour rater than stringered or fissure-like. A suitable crushing strength for a thirty micron-particle size of dysprosium oxide when used in a titanium matrix has been found to be from one-half to three-quarters of a pound per particle.

FIGURES 2–6 show in cross-section a portion of the rod after the various stages. FIGURE 2 illustrates the rod after the sintering step, and shows the matrix material 20 and the enclosed dispersed oxide particles 22, with the exposed oxide particles being designated at 24. The oxide particles 22 and 24 are nearly in their original configurations, and are not excessively elongated or flattened, due to their high crushing strength.

FIGURE 3 shows the same portion of the rod after hot rolling, with the oxide particles 22, 24 slightly distorted from their original granular shape.

FIGURE 4 shows the same portion of the rod after the surface oxide particles have been removed, leaving the pits 26 exposed on the rod surface 28. After optional further hot working and cold rolling, the surface pits 26 are flattened, as shown in FIGURE 5, and the rod has a substantially smooth outer surface 28 of the matrix metal. Smoothing of the outer surface is desirable when further cladding is not required.

FIGURE 6 illustrates the same portion of the rod which will be provided with a layer of cladding 30, which may be of stainless steel or some other suitable cladding metal. Due to the absence of exposed oxide particles, cladding layer 30 is uniformly bonded to the rod surface at the oxide-free bond line 32 and gives added isolation of particles 22 from the reactor cooling fluids. The smoothing operation shown in FIGURE 5 may be eliminated to retain a finely pitted or roughened surface for better adhesion of the cladding layer 30 at the bond line 32.

The presence of the dispersed powder has been found to increase the tensile strength of the rod up to 1.5 to 2 times that of pure titanium. It has also been found that up to about 35% by weight of the selected neutron absorber may be added to the matrix before changes in physical properties materially affect such rods for use in nuclear reactors.

The substantial increase in tensile strength produced by inclusion of a powder in the matrix is useful in environments other than in nuclear reactors, for example, in air frames, coverings and other structural members. For such uses it is understood that the dispersed powder need not be a neutron absorber, but may be any of a number of granular materials which are stable under the temperatures and pressures used to prepare and work the matrix.

Example II

Finely divided aluminum metal of 30 micron size (minus 325 mesh) and aluminum oxide ($Al_2O_3$) of 30 micron size are uniformly blended in the relative proportions by weight of 90 percent aluminum and 10 percent aluminum oxide. The mixture is then cold pressed to 85 percent of its maximum density (i.e. approximately 15 percent residual interval void space). The compressed mixture is then sintered at a temperature of about 900 degrees Fahrenheit for one and one-half hours. The resulting piece is encased in a steel envelope and hot rolled at a temperature of about 700 degrees Fahrenheit to the desired thickness. The steel envelope is then removed by mechanical stripping. The piece is then subjected to a reagent which selectively attacks the dispersed oxide, e.g., high pressure water at a temperature of 500 degrees Fahrenheit in order to leach or remove the aluminum oxide particles present on the surface of the article. Following the leaching process, the piece may then be further cold rolled in order to further smooth the surface and provide the desired thickness.

The article thus prepared has a surface which is substantially free of the oxide, and which is therefore suitable for cladding with another layer of metal, for welding, soldering, etc. The resulting article has a substantially greater tensile strength than pure aluminum and these properties permit the object to be utilized in structural applications requiring high tensile strength.

The matrix material is not limited to aluminum nor is the dispersed granular powder limited to aluminum oxide. For example, instead of aluminum, the matrix metal may be any metal which has properties suitable for structural uses, such as aluminum alloys, zirconium alloys or stainless steels. Instead of the aluminum oxide specified above, the dispersed medium may be other granular materials, such as the nickel or iron oxides, silicates, etc.

A wide range of reagents or solvents may be used to remove the exposed dispersed particles from the matrix, depending on the nature of the particles and the matrix material. Similarly, the proportions, temperatures and pressures listed in the examples are merely exemplary for the particular materials there disclosed, and may vary for other materials.

It has been made apparent from the above description that there has been provided a novel method for making improved control rods for nuclear reactors and structural members for a number of other uses. The control rods may be further protected by cladding the rod with a layer of a suitable material, such as a zirconium alloy, since the clean matrix surface left after the exposed neutron absorber is removed is properly prepared to permit uniform metallurgical bonding of the matrix to the cladding layer. In structural applications it may also be desirable to clad the matrix surface for its ultimate use. One example may be in high speed aircraft or missile coverings or "skin." In these applications an uneven or slightly pitted surface may be very undesirable. The clean matrix surfaces are also well prepared for such operations as welding, brazing or soldering without interference from the dispersed particles. The increase in tensile strength afforded by these members provides substantial improvements in structural design of airframes and the like, and the control rods made according to the invention have increased physical strength as well as having a desired non-contaminating outer surface.

It will thus be seen that the objects set forth above among those made apparent from the preceding description, are efficiently attained, and, since certain changes may be made in carrying out the above process and in the constructions set forth without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Having described the invention, what is claimed as new and desired to secure by Letters Patent is:

1. The method of making a structural metal article comprising the steps of:
    (a) uniformly blending a finely divided matrix metal and finely divided metal oxide particles,
        (1) said metal oxide particles having a crushing strength greater than the pressure required to bind together said matrix metal,
    (b) compressing said blend of finely divided metal and metal oxide to bind said matrix metal together without crushing said metal oxide particles,
        (1) the metal oxide particles substantially retaining their general shape during compression,
    (c) sintering said compressed blend to form a coherent article,
    (d) treating said coherent article with a chemical agent which removes the metal oxide particles on the surface of the article, but which does not substantially affect said matrix metal, and then
    (e) removing said treating agent from the article surface.

2. The method of making a structural metal article comprising the steps of:
    (a) uniformly blending a finely divided matrix metal and finely divided metal oxide particles,
        (1) said metal oxide particles having a crushing strength greater than the pressure required to bind together said matrix metal,
    (b) compressing said blend of finely divided metal and metal oxide to bind said matrix metal together without crushing said metal oxide particles,
        (1) the metal oxide particles substantially retaining their general shape during compression,
    (c) sintering said compressed blend to form a coherent article,
    (d) treating said coherent article with a chemical agent which removes the metal oxide particles on the surface of the article, but which does not substantially affect said matrix metal,
    (e) removing said treating agent from the article surface, and then
    (f) cladding said article with a protective sheathing.

3. The method of making a control rod for a nuclear reactor comprising the steps of:
    (a) uniformly blending a finely divided matrix metal and a finely divided compound selected from the group consisting of inorganic compounds of dysprosium, europium, samarium, gadolinium, boron, and cadmium, said compound having a greater crushing strength than the pressure required to bind said matrix metal together,
    (b) compressing said blend to bind said matrix metal together without crushing said finely divided compound therein,
    (c) sintering said compressed blend to form a coherent rod,
    (d) treating said compressed coherent rod with an agent which removes the surface compound but which does not substantially affect said matrix metal,
    (e) removing said treating agent, and then
    (f) cladding said rod with a protective sheathing.

4. The method of making a nuclear control rod comprising the steps of:
    (a) uniformly blending,
        (1) from 99.9% to 65% of a finely divided structural metal, said structural metal having a sintering temperature lower than its melting temperature, and,
        (2) from 0.1% to 35% of a finely divided neutron absorber selected from the class consisting of compounds of the elements europium, samarium, gadolinium, dysprosium, boron and cadmium, which are stable at said sintering temperature,
    (b) compressing said blend, (c) sintering said compressed blend to provide a coherent control rod having said neutron absorber uniformly dispersed within a matrix of said structural metal, (d) treating said control rod with an agent which selectively removes the neutron absorber exposed on the surface of said rod without substantially attacking said matrix, and then (e) cladding said control rod with a protective sheathing.

5. The method of making a nuclear control rod comprising the steps of:

(a) uniformly blending
  (1) from 99.9% to 65% of a finely divided structural metal,
    (i) said structural metal having a sintering temperature lower than its melting temperature,
    (ii) said structural metal being composed of particles having a given crushing strength, and
  (2) from 0.1% to 35% of a finely divided neutron absorber selected from the class consisting of compounds of the elements europium, samarium, gadolinium, dysprosium, boron and cadmium, which are stable at said sintering temperature, the particles of said neutron absorber having a greater crushing strength than said structural particles, (b) compressing said blend, (c) sintering said compressed blend to provide a coherent control rod having said neutron absorber uniformly dispersed within a matrix of said structural metal, (d) treating said control rod with an agent which selectively removes the neutron absorber exposed on the surface of said rod without substantially attacking said matrix, and then (e) cladding said control rod with a protective sheathing.

References Cited by the Examiner

UNITED STATES PATENTS

| | | | |
|---|---|---|---|
| 2,462,045 | 2/1949 | Wulff. | |
| 2,852,366 | 9/1958 | Jenkins | 75—201 |
| 2,866,741 | 12/1958 | Hausner | 29—182.5 |
| 2,900,316 | 8/1959 | Kaufman | 176—34 |
| 3,004,332 | 10/1961 | Werner | 75—206 X |
| 3,009,809 | 11/1961 | Neri | 75—201 |
| 3,024,110 | 3/1962 | Funkhouser et al. | |
| 3,091,581 | 5/1963 | Barr et al. | 75—212 X |

CARL D. QUARFORTH, *Primary Examiner.*

REUBEN EPSTEIN, *Examiner.*